(12) United States Patent
Chang

(10) Patent No.: US 7,567,901 B2
(45) Date of Patent: *Jul. 28, 2009

(54) BIO-PHONETIC MULTI-PHRASE SPEAKER IDENTITY VERIFICATION

(75) Inventor: Hisao M. Chang, Austin, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/787,091

(22) Filed: Apr. 13, 2007

(65) Prior Publication Data

US 2007/0198264 A1     Aug. 23, 2007

Related U.S. Application Data

(63) Continuation of application No. 10/367,629, filed on Feb. 13, 2003, now Pat. No. 7,222,072.

(51) Int. Cl.
G10L 17/00     (2006.01)

(52) U.S. Cl. .................................... 704/247

(58) Field of Classification Search ................. 704/246, 704/247, 250, 273; 379/88.01, 88.02
See application file for complete search history.

(56) References Cited

U.S. PATENT DOCUMENTS

| 4,998,279 | A | 3/1991 | Weiss |
|---|---|---|---|
| 5,280,527 | A | 1/1994 | Gullman et al. |
| 5,335,276 | A | 8/1994 | Thompson et al. |
| 5,365,574 | A | 11/1994 | Hunt et al. |
| 5,517,558 | A | 5/1996 | Schalk |
| 5,548,647 | A | 8/1996 | Naik et al. |
| 5,677,989 | A | 10/1997 | Rabin et al. |
| 5,825,871 | A | 10/1998 | Mark |
| 5,897,616 | A | 4/1999 | Kanevsky et al. |
| 5,907,597 | A | 5/1999 | Mark |
| 6,067,347 | A | 5/2000 | Farris et al. |
| 6,092,192 | A | 7/2000 | Kanevsky et al. |
| 6,101,242 | A | 8/2000 | McAllister et al. |
| 6,161,090 | A | 12/2000 | Kanevsky et al. |
| 6,167,517 | A | 12/2000 | Gilchrist et al. |
| 6,243,678 | B1 | 6/2001 | Erhart et al. |
| 6,311,272 | B1 | 10/2001 | Gressel |
| 6,393,305 | B1 | 5/2002 | Ulvinen et al. |
| 6,442,519 | B1 | 8/2002 | Kanevsky et al. |
| 6,480,825 | B1 | 11/2002 | Sharma |
| 6,760,701 | B2 | 7/2004 | Sharma et al. |
| 6,898,568 | B2 * | 5/2005 | Ng et al. ..................... 704/246 |
| 6,999,928 | B2 * | 2/2006 | Wang et al. .................. 704/250 |
| 7,039,951 | B1 * | 5/2006 | Chaudhari et al. ............. 726/7 |
| 7,124,085 | B2 * | 10/2006 | Junqua et al. ............ 704/270.1 |
| 2001/0049785 | A1 | 12/2001 | Kawan et al. |
| 2002/0147914 | A1 | 10/2002 | Arnold |

* cited by examiner

*Primary Examiner*—Michael N Opsasnick
(74) *Attorney, Agent, or Firm*—Brinks Hofer Gilson & Lione

(57) ABSTRACT

Systems and methods for bio-phonetic multi-phrase speaker identity verification are disclosed. Generally, a speaker identity verification engine generates a dynamic phrase including at least one dynamically-generated word. The speaker identity verification engine prompts a user to speak the dynamic phrase and receives a dynamic phrase utterance. The speaker identity verification engine extracts at least one voice characteristic from the dynamic phrase utterance and compares the at least one voice characteristic with a voice profile the generate a score. The speaker identity verification engine then determines whether to accept a speaker identity claim based on the score.

20 Claims, 5 Drawing Sheets

BIO-PHONETIC MULTI-PHRASE SPEAKER IDENTITY VERIFICATION

RELATED APPLICATIONS

The present application is a continuation of U.S. patent application Ser. No. 10/367,629, filed Feb. 13, 2003, now U.S. Pat. No. 7,222,072 the entirety of which is hereby incorporated by reference.

BACKGROUND

1. Field of the Invention

The present invention relates to speaker identity verification methods and systems.

2. Description of the Related Art

Automatic speech recognition (ASR), in general, and speaker identity verification (SIV) applications, in particular, are used in network-based applications to provide secure access to online information or a physical facility. Using an SIV application, a caller may speak into a telephone device to gain access to a secure device via a telephone network. The SIV application verifies the identity of the caller based on his/her speech.

Early systems in network-based SIV applications created a voice profile or voice print for a pre-qualified user under a unique personal identification number (PIN). For an initial enrollment or registration session, the system asks the user to record a few utterances of certain texts. Such text-dependent schemes may include 10-digit telephone numbers, special alphanumeric strings of certain meaning (e.g. "ABC1234") or public/group passwords (e.g. "Dallas Cowboy"). The recorded speech materials, having length of about 10 to 20 seconds, are used to construct a voice profile or voice print for the user using a system-wide unique PIN.

In subsequent verification sessions, a caller first makes a speaker identity claim (SIC) using a valid PIN in a proper modality such as voice, touch-tone, or a smart card. The system uses the PIN to initialize an SIV engine based on the previously-created voice profile associated with this PIN. Thereafter, the system asks the caller to speak a few phrases in order to determine if the voice matches the voice profile. This process is known as a two-step process: (a) get a PIN and (b) verify the SIC using additional speech materials.

More recent systems use a one-step process. The system asks the caller to speak his/her PIN. Using an embedded ASR engine, the system first recognizes the PIN that was spoken. Thereafter, the system retrieves the voice profile registered under the PIN, and compares the voice characteristics extracted from the speech (e.g. the spoken PIN) against the claimed voice profile. To prevent an imposter from using a recorded source (e.g. one obtained from secretly taped conversations with an authorized user) to break-in this one-step SIV process, some systems of this type generate a sequence of random digits (e.g. "one five two four") and then ask the caller to say the sequence.

With increasingly sophisticated digital recording technology such as an MP3-enable device with a telephony interface, it is conceivable that imposters could compose on demand a digit sequence using previously-recorded digits spoken by a true speaker. In a Voice-over-Internet-Protocol (VoIP)-based SIV scenario, the imposter could use real-time digital signal processing (DSP) technology to concatenate individual digits recorded earlier to form the required digit sequence and then send a data packet to a remote SIV server.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Disclosed herein are methods and systems for speaker identity verification to mitigate compose-on-demand threats by using private and dynamically-generated new bio-phonetic phrases that are unknown to imposters. Multiple phrases are generated from a body of text that is phonetically rich in exploring voice characteristics of individual speakers. The text contains biographical, geographical and time-sensitive transactional (BGTST) data that are private to individual users within an SIV application. The biographical information in the text may comprise static information such as a user's name, birth date, or place of birth. The geographical information in the text may comprise a user's work telephone number or a home address. A part of the text is dynamic and updated periodically from a time-sensitive transactional data source that is accessible only to an entity (e.g. a company) deploying the SIV applications. Such a data source can come from the company's information technology (IT) systems, time sheets, calendars, electronic mail, travel log, payroll systems, and sales reports, for example.

Using the text, the system generates a sufficient number of SIV phrases (e.g. 30 seconds of speech material) to satisfy load factors required by a hybrid text-dependent and text-independent SIV engine. In an enrollment session, the user's speech is captured as a voice profile associated with a unique and system-authorized SIC. Data records of all voice profiles are stored in a voice profile database.

Beneficially, the text selection of phonetic-rich and non-user specific recording material is augmented with a user's BGTST data set. Digits extracted from various contexts are used to improve (and ideally maximize) a co-articulation effect embedded in people's speaking behavior. The digits are selected to include those of high frequency in everyday speech by specific users such as their work telephone number or the five-digit ZIP code for their office location. The result of this text selection process is a personalized recording script that is read by the caller at a time of registration. The recording script includes use of locality information relevant to certain groups of users. For example, a first group of users in one city may have a different recording script that a second group of users in another city. Including geographical separation in the design of recording scripts localizes a potential break-in by imposters. In other words, an imposter is not able to use a taped recording from one group of users to apply to another group of users.

Figure 1:
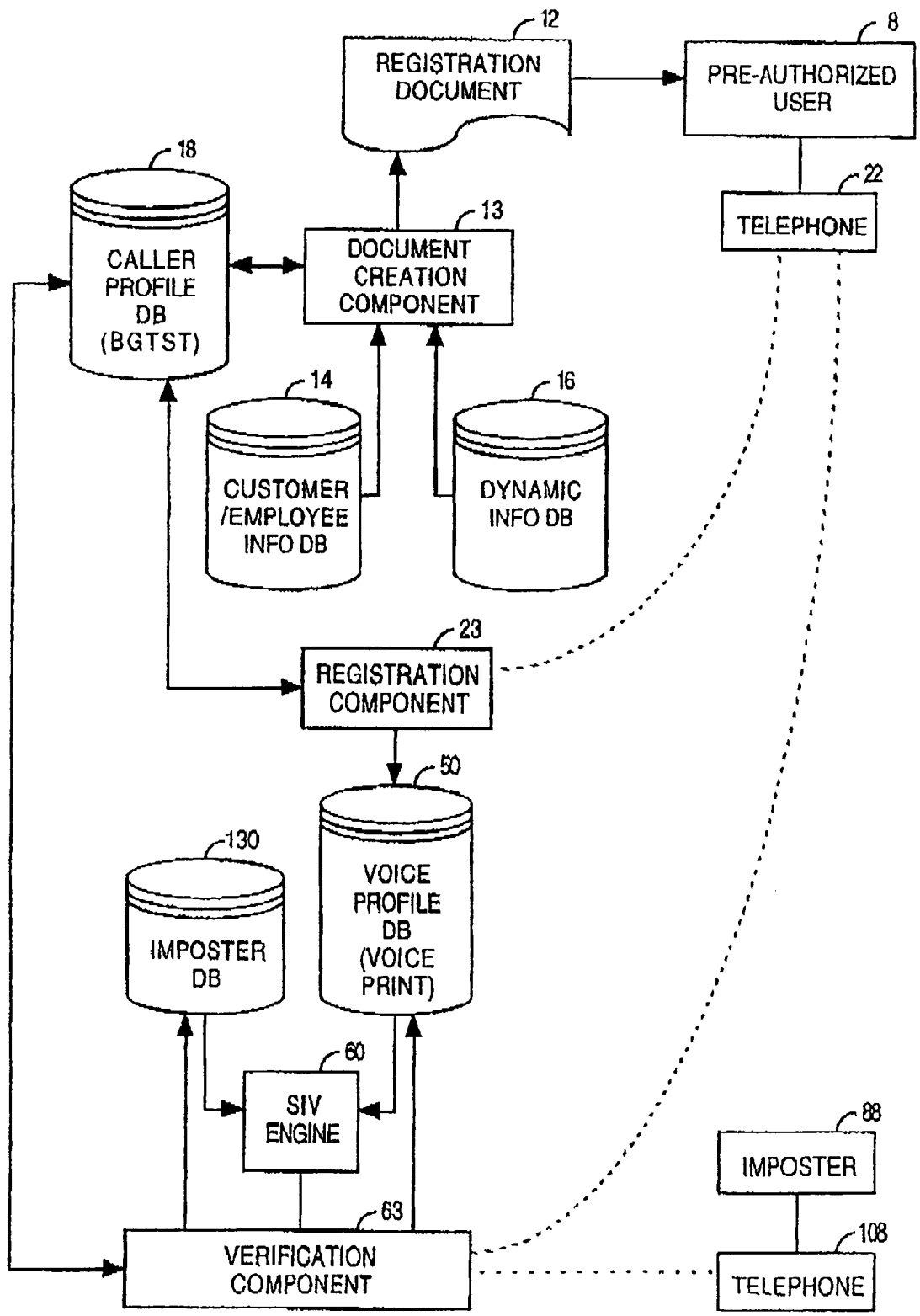
FIG. 1 is a block diagram of an embodiment of a system for performing SIV.
Figure 2:
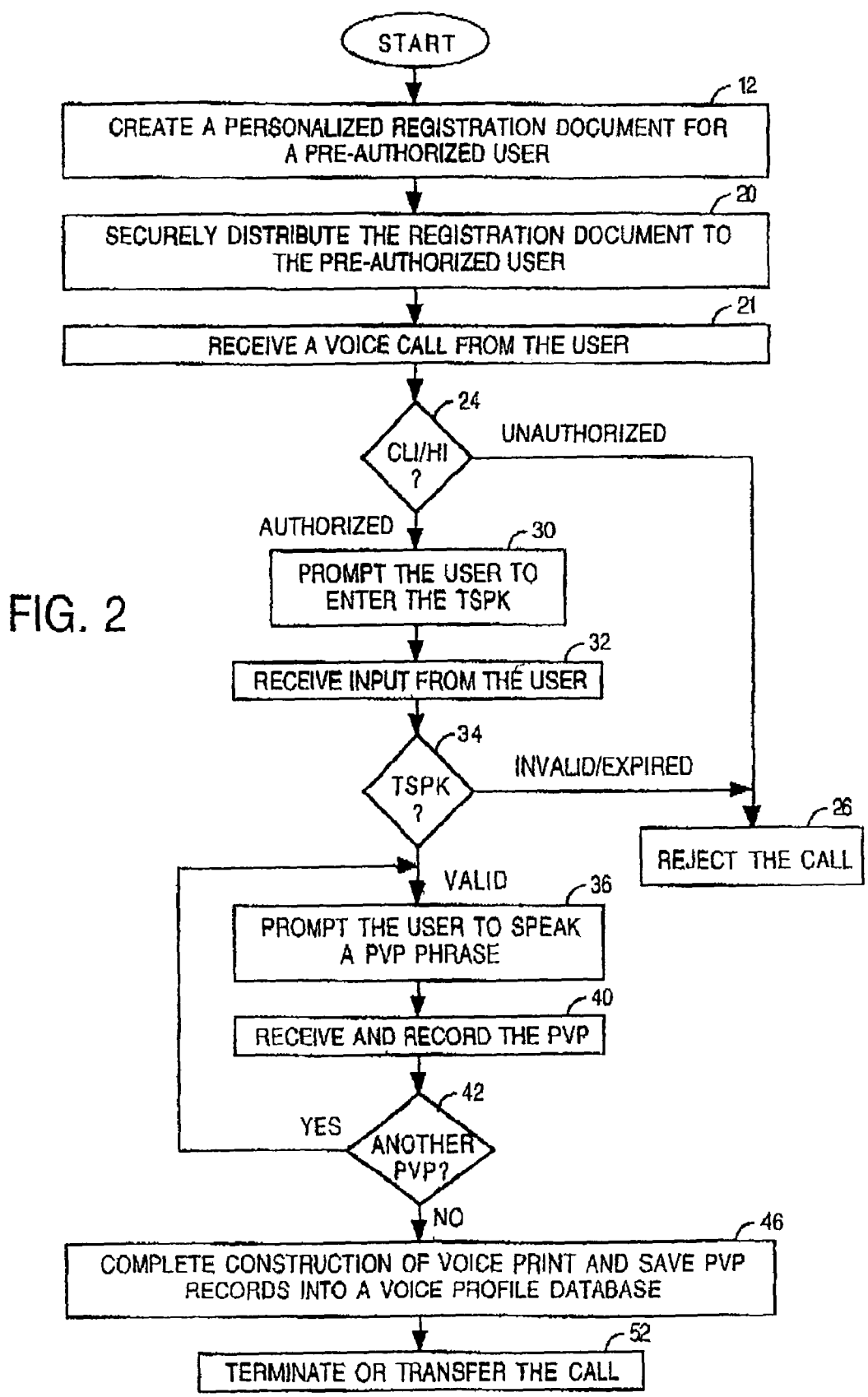
FIG. 2 is a flow chart of an embodiment of pre-enrollment and enrollment acts for a pre-authorized user of the SIV system.

FIG. 1 is a block diagram of an embodiment of a system for performing SIV in accordance with the present invention. FIG. 2 is a flow chart of an embodiment of pre-enrollment and enrollment acts for a pre-authorized user 8 of the SIV system.

As shown in FIG. 1, an act of creating a personalized registration document 12 for the user 8 is performed before an initial registration. The personalized registration document is created by a document creation component 13 using one or more BGTST data sources. The BGTST data sources comprise three types of user-specific information: biographical information, geographical information, and time-sensitive transaction (TST) information. Examples of the biographical information include, but are not limited to, the user's name, the user's date of birth, and the user's place of birth. Examples of the geographical information include, but are not limited to, the user's work phone number, and a postal code such as a ZIP code of the user's work location. Examples of the TST information include, but are not limited to, information about the user's last business trip (e.g. where and when), and his/her latest project codes.

The biographical and geographical information can be obtained from a database 14. The database 14 may comprise an employee database and/or a customer database. The TST information is obtained from a database 16. The database 16 includes dynamic information associated with the user. The BGTST data is stored to a caller profile database 18.

For purposes of illustration and example, consider a hypothetical user whose name is John Smith. The caller profile database 18 has the following information specific to John Smith: a work telephone number of 512-555-0157, a work fax number of 512-555-0144, an office address of 9505 Houston Avenue in Austin, Tex., an office number of 320, and a home address of 1234 Great Hills Trail. The personalized registration document 12 may say "Please the following when prompted: Sam Houston led a battle in Texas with fifty-five solders on Great Hills. Five came from Austin and fifty-seven from forty-four small towns nearby. One two three four five and twenty as they walk through trail oh and nine." Portions of the text are underlined in this patent application for illustrative purposes to indicate which portions directly correspond to personal information (i.e. the underlining is absent from the registration document 12 sent to the user).

Speaker-independent text that is not user-specific may be included in the personalized registration document 12. This type of text is pre-selected for either a general user population or based on individual user groups such as all authorized users within a geographical region or within a functional group (e.g. everyone in a sales organization). This speaker-independent text contains carefully selected word sequences that provide maximum exposure of the co-articulation effect of individual speakers. For example, a sentence such as "where were you a year ago" has vowel or semi-vowel transitions between every word pair in the sentence. This type of sentence is phonetically balanced on vowels or other classes of sounds (e.g. semi-vowels, diphthongs, stops, or fricatives) to reveal the subtlety of the voice characteristics of individual speakers. Therefore, the recording of these non-user-specific texts enable the system to capture the full spectrum of the speaker during the registration process.

For each registration document 12, a special time-sensitive private key (TSPK) is generated provided therewith. The TSPK is used to mitigate unauthorized users from registering without having registration document 12. In one embodiment, the TSPK may comprise an alphanumeric sequence.

As indicated by block 20, an act of securely distributing the registration document 12 to the pre-authorized user 8 is performed. The registration document 12 may be securely delivered electronically, e.g. using a desktop e-mail system at the company deploying the SIV application. Alternatively, the registration document 12 may be securely delivered in a physical manner, e.g. using company mail or a courier to deliver the registration document 12 to the user 8 by his/her supervisor. Other secured means are also within the scope of this disclosure.

As indicated by block 24, an act of receiving a voice call from the user 8 is performed. The user 8 uses a telephone 22 to make the voice call to a particular telephone number to register his/her voice profile. In one embodiment, the voice call must originate from a line that delivers calling line identification (CLI) or caller identification (caller ID) information. The voice call can be made via a private or public circuit-switched telephone network (PSTN) or another time-division multiplexing (TDM) network. Alternatively, the voice call can be made via a packet switching network such as a VoIP call from a Session Initiation Protocol (SIP) phone or an SIP-enabled device such as a wired or wireless personal digital assistant (PDA) device.

The voice call is processed by a registration component 23. Upon receiving the voice call, an act of checking for an authorized CLI associated with the call is performed, as indicated by block 24. If the CLI does not match a record in the system, the call is rejected, as indicated by block 26. If the call is originated in a simultaneous voice and data connection, e.g. from either a 3.sup.rd generation wireless terminal or an SIP phone, the host ID (HI) associated with the data session is extracted from a header of a call set-up packet. The HI is checked in addition to the CLI in block 24. Thus, any calls with an unauthorized CLI or HI are rejected, as indicated by block 26. A trace record is generated for each rejected call. The trace record can be used for offline inspection or may be sent to another process for imposter analysis.

If the CLI and HI, if applicable, are accepted, an act of prompting the user 8 enter the TSPK is performed, as indicated by block 30. This act may comprise generating an audible message in the voice call, such as "Please enter the private key". As indicated by block 32, an act of receiving a user-initiated input is performed. The input can be implemented in different modalities such as voice, dual-tone modulation frequency (DTMF) or touch tone, or soft keys on a 3.sup.rd generation wireless terminal or an SIP phone that is capable of simultaneous voice and data connections to the system.

As indicated by block 34, an act of determining if the input is a currently-valid TSPK is performed. If the input either is invalid or has expired, the call is rejected as indicated by block 26. A trace record is generated for offline inspection or may be sent to another process for imposter analysis.

As indicated by block 36, an act of prompting the user 8 to speak a phrase in order to record his/her personal voice profile (PVP). Initially, the user 8 may be prompted to read text from the personalized registration document 12, for example by generating an audible message in the voice call such as "Please read the text from the registration document".

As indicated by block 40, an act of receiving and recording the PVP phrase from the user 8 is performed. A partial voice print is constructed based on phrases recognized by an embedded ASR engine.

The user 8 may be required to provide additional voice input based on text generated at run-time (i.e. text not included in the personalized registration document 12). If another PVP phrase is to be recorded (block 42), the user 8 is prompted to speak another phrase (block 36). The phrase is generated based on information from the caller profile database 18. The prompt may include a question such as "What is your service start date?" or "What is your supervisor's name?". A vocal response from the user 8 is received and recorded as a PVP phrase (block 40).

If no additional PVP phrases are to be recorded, the enrollment session is concluded. As indicated by block 46, an act of completing construction of the voice print and saving PVP records into a voice profile database 50. As indicated by block 52, the call is either terminated or transferred to another online system.

Figure 3A:
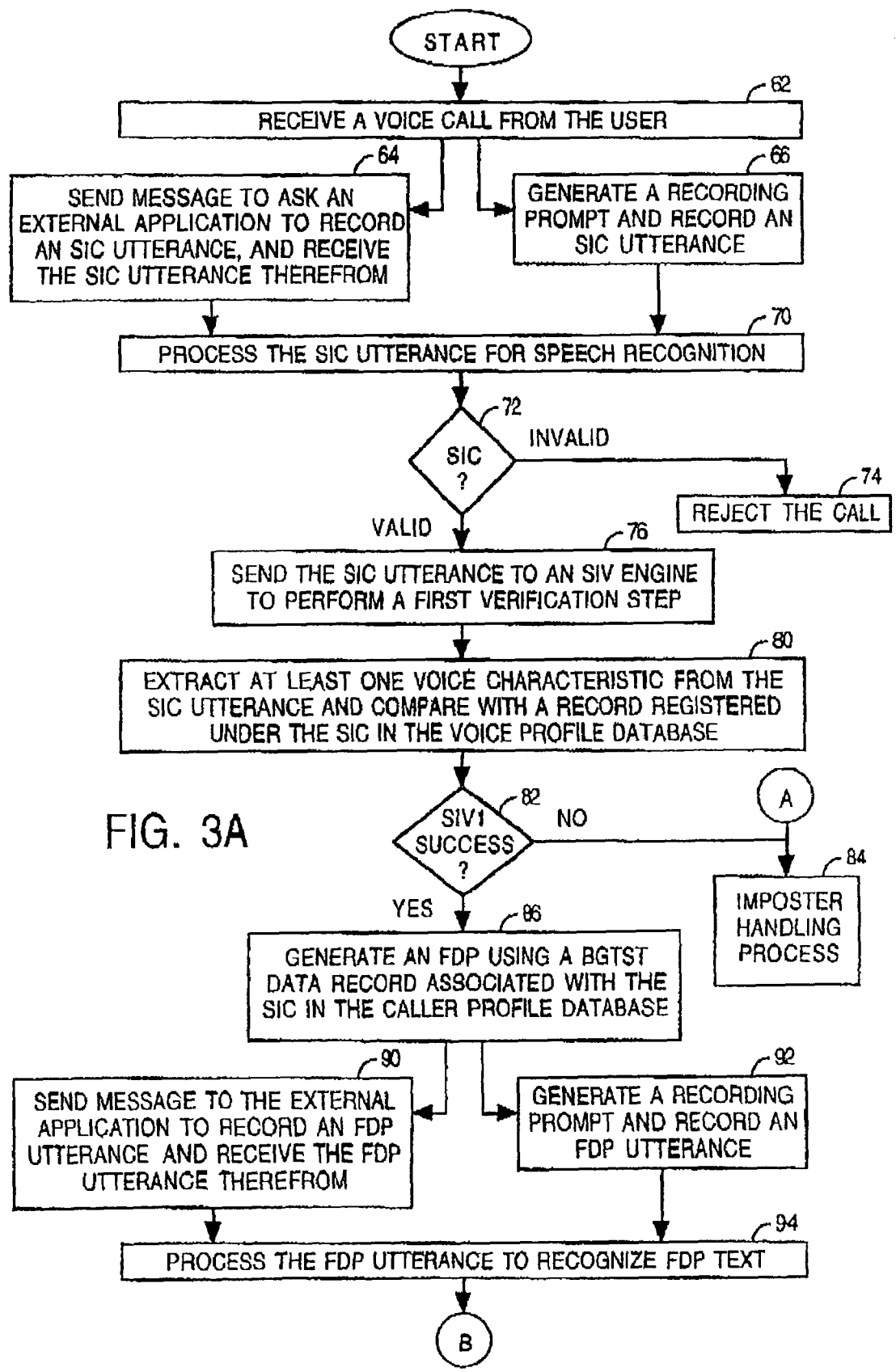
FIGS. 3(A-B) show a flow chart of an embodiment of caller authentication acts using the SIV system.
Figure 3B:
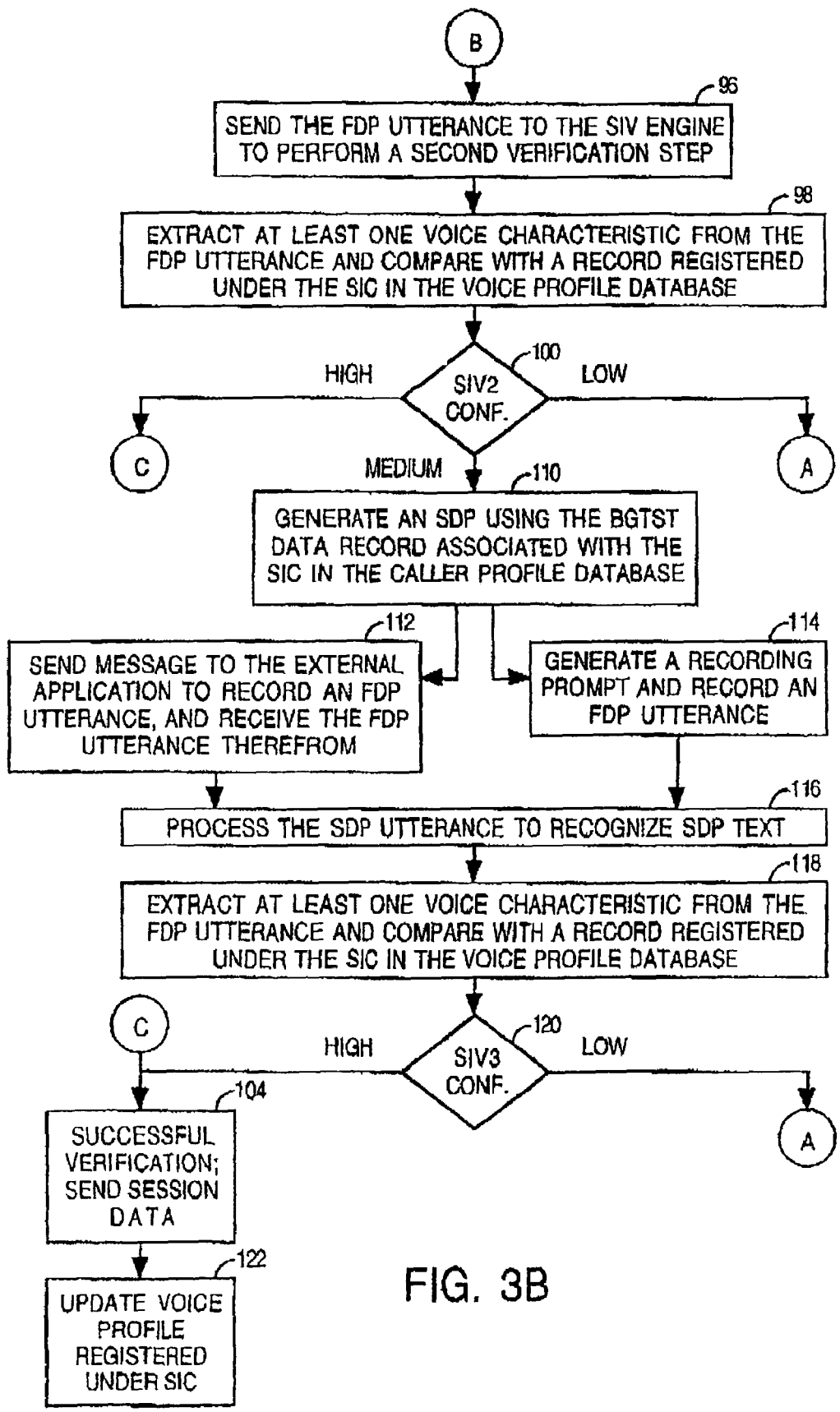

The PVP records in the voice profile database 50 are used by an SIV engine 60 to authenticate the user 8 in subsequent verification sessions. FIGS. 3(A-B) show a flow chart of an embodiment of caller authentication acts using the SIV engine 60, the voice profile database 50, and the caller profile database 18.

As indicated by block 62, an act of receiving a voice call from the user 8 is performed. The voice call is made from the telephone 22 or another telephone to initiate a verification session. A verification component 63 directs the verification session.

The voice call can be made via either a private or public circuit-switched telephone network (PSTN) or another time-division multiplexing (TDM) network, or a packet switching network such as a VoIP call from an SIP phone or SIP-enabled device. Verification sessions also can be initiated from other online systems such as an Interactive Voice Response (IVR) system with a VoIP link, or a normal local-area network (LAN)/wide-area network (WAN) connection to the SIV system. An online system requesting an SIV verification service can be referred to an external application.

When a request comes from an external application, a message is sent back to ask the external application to record an SIC utterance, and the recorded SIC utterance is received from the external application (block 64). When a request comes from an integrated SIV application, acts of generating a recording prompt and recording the SIC utterance are performed (block 66). In either case, as indicated by block 70, the SIC utterance is processed for speech recognition. Examples of the SIC utterance include, but are not limited to, a ten-digit telephone number and an alphanumeric PIN.

Conditional block 72 indicates an act of determining if the recognized SIC is valid. If the SIC is invalid, at least one rejection act is performed (block 74). For example, the call may be terminated or a rejection notice may be sent to the external application initiating the verification session.

If the recognized SIC is valid, the recorded SIV utterance is sent to the SIV engine 60 to perform a first verification step (block 76). The SIV engine 60 extracts voice characteristics from the recorded SIC utterance and compares the characteristics with a record registered under the SIC in the voice profile database 50 (block 80). As indicated by block 82, the result of this first verification step (in the form of a first score) is sent to a decision process to decide whether or not the characteristics of recorded SIC utterance is consistent with the voice profile. If the decision process indicates an unsuccessful first verification step, the call record and the recorded SIC utterance are sent to an imposter handling process (block 84).

If the decision process indicates a successful first verification step, the call record is sent to a process to perform a second verification step. The second verification step comprises generating a first dynamic phrase (FDP) using a BGTST data record associated with the SIC in the caller profile database 18 (block 86). Examples of the FDP include, but are not limited to, "Five digit ZIP code for your work location?" and "Last four digits of your supervisor's work phone number?". The FDP dialog acts to increase the time required for an imposter 88 to guess a correct combination of digits and then playback a taped or digitally-recorded digit utterances from the true speaker, namely the user 8.

If the verification process is initiated by an external application, a data record containing the FDP and proper prompt text is sent to the external application (block 90). The external application, in turn, plays the prompt to the call, records the FDP utterance, and sends back the recorded FDP utterance. Otherwise, the SIV application uses a build-in ASR engine to record the FDP utterance (block 92). Examples of the FDP utterance include, but are not limited to, digit strings and alphanumeric strings.

As indicated by block 94, the FDP utterance is processed to recognize the FDP text. As indicated by block 96, the FDP text is sent to the SIV engine 60. As indicated by block 98, the SIV engine 60 extracts voice characteristics from the FDP utterance and compares the voice characteristics with a FDP record retrieved from the voice profile database 50 using the SIC as the search key. As indicated by block 100, the result of this second verification step (in the form of a second score) is sent to a decision process to decide a degree of confidence in positively verifying the caller as the true speaker registered under the SIC. The confidence value is based on multiple factors including the first score and the second score.

If the decision process indicates a low degree of confidence (e.g. if the confidence value is below a lower threshold), the entire session data record is sent to the imposter handling process (block 84).

If the decision process indicates a high degree of confidence (e.g. if the confidence value is greater than an upper threshold), the verification is deemed to be successful. The caller is positively authenticated based he/she having a valid SIC, knowing the correct answer to the FDP question, and his/her bio-phonetic speech characteristics. As indicated by block 104, the entire session data record is sent to a process to update the voice profile in the voice profile database 50.

If the decision process indicates a medium degree of confidence (e.g. if the confidence value is less than the upper threshold but greater than the lower threshold), the result of the decision process and the session history data are sent to a process to perform a third verification step.

The upper and lower decision thresholds are initially set on a system-wide basis using prior information. Once the system is operational, a decision threshold adapter automatically adjusts the thresholds on a per-user basis using their SIC. Thus, the upper and lower thresholds are adjusted over time by the system.

The self-tuning process is governed by a combination of scheduled events, e.g. daily triggers, weekly triggers, and volume-based triggers. A volume trigger occurs when a predetermined amount of usage is recorded within a predetermined time period.

The effect of adapting the thresholds is to change boundary points between the three confidence ranges, which either tighten or loosen the three confidence ranges. For example, if the boundary point between the medium and high range is initially set to 0.75 (i.e. the upper threshold is 0.75), the high confidence range is [0.75, 1.0]. Thereafter, if a user has many successful verification sessions based on the FDP with high scores above 0.90, the upper threshold is increased within a predefined ceiling (e.g. 0.92). This effectively reduces the high confidence range thus making the system more difficult for the imposter 88 to penetrate using a telephone 108. On the other hand, if a user has many marginal passes based on the FDP, the upper threshold is decreased (e.g. down to 0.72). This reduces a chance of a false rejection in a future session for the user.

The third verification step comprises generating a second dynamic phrase (SDP) using a BGTST data record associated with the SIC in the caller profile database 18 (block 110). The SDP can be a simple phrase like "Dallas Cowboy" or "Mary Smith at Austin Limit", where individual words like Dallas have spoken instances available from the recording materials obtained during the registration session. The user 8 may be asked to say the SDP more than once, e.g. "Please say 'Dallas Cowboy' twice". A finer analysis of the SDP utterance from the caller can be performed using various context-synchronized phonetic scoring methods. More sophisticated SDP design can lead to a free-formatted spontaneous answer to a direct or indirect question like "What is the weather in Dallas?" or "How was your last meeting on <date>?" where <date> represents date information dynamically generated from the BGTST data record.

If the verification process is initiated by an external application, the prompt text and dialog context are sent to the external application (block 112). The external application, in turn, plays the prompt to the call, records the SDP utterance, and sends back the recorded SDP utterance. Otherwise, an SDP dialog definition data block is sent to a process for speech recognition (block 114). The dialog definition data block can be represented by an extensible markup language (XML)-style document, such as a VoiceXML document or a SALT-based document, that can be executed by a VoiceXML or SALT interpreter residing on a different system. The SDP utterance that is recorded and subsequently recognized is sent to the SIV engine 60 for final verification.

As indicated by block 116, the SDP utterance is processed to recognize the SDP text. As indicated by block 118, the SIV engine 60 extracts voice characteristics from the SDP utterance and compares the voice characteristics with an SDP record retrieved from the voice profile database 50 using the SIC as the search key. As indicated by block 120, the result of this third verification step (in the form of a third score) is sent to a decision process to decide an overall degree of confidence in positively verifying the caller as the true speaker registered under the SIC. The confidence value is based on multiple factors including the first score, the second score and the third score. Based on the confidence value, the decision process makes a binary decision (high or low) in determining if the caller can be positively identified.

If the decision process indicates a low degree of confidence (e.g. if the confidence value is below a threshold), the entire session data record is sent to the imposter handling process (block 84).

If the decision process indicates a high degree of confidence (e.g. if the confidence value is greater than the threshold), the verification is deemed to be successful. As indicated by block 104, the entire session data record, including voice recordings of the SIC, FDP and SDP, is sent to a process to update the voice profile in the voice profile database 50.

As indicated by block 122, the voice profile registered under the SIC is updated for each successful verification session. The SIC is updated to accommodate changes in the caller's voice due to normal aging processes. The update also assists in reflecting channel variations associated with calls that may come from a different network connection or from those telephone handsets that have different transducer characteristics (i.e. microphones used in the handsets). The result of the updated voice profile is stored to the voice profile database 50.

By updating voice profiles stored in the voice profile database 50 on a per use basis, the system can incrementally collect more speech materials for the authenticated users each time they enter the system. The quality of the underlying voice print not only is maintained as the authenticated users age, but is also improved over time through constantly refining the data models.

Figure 4:
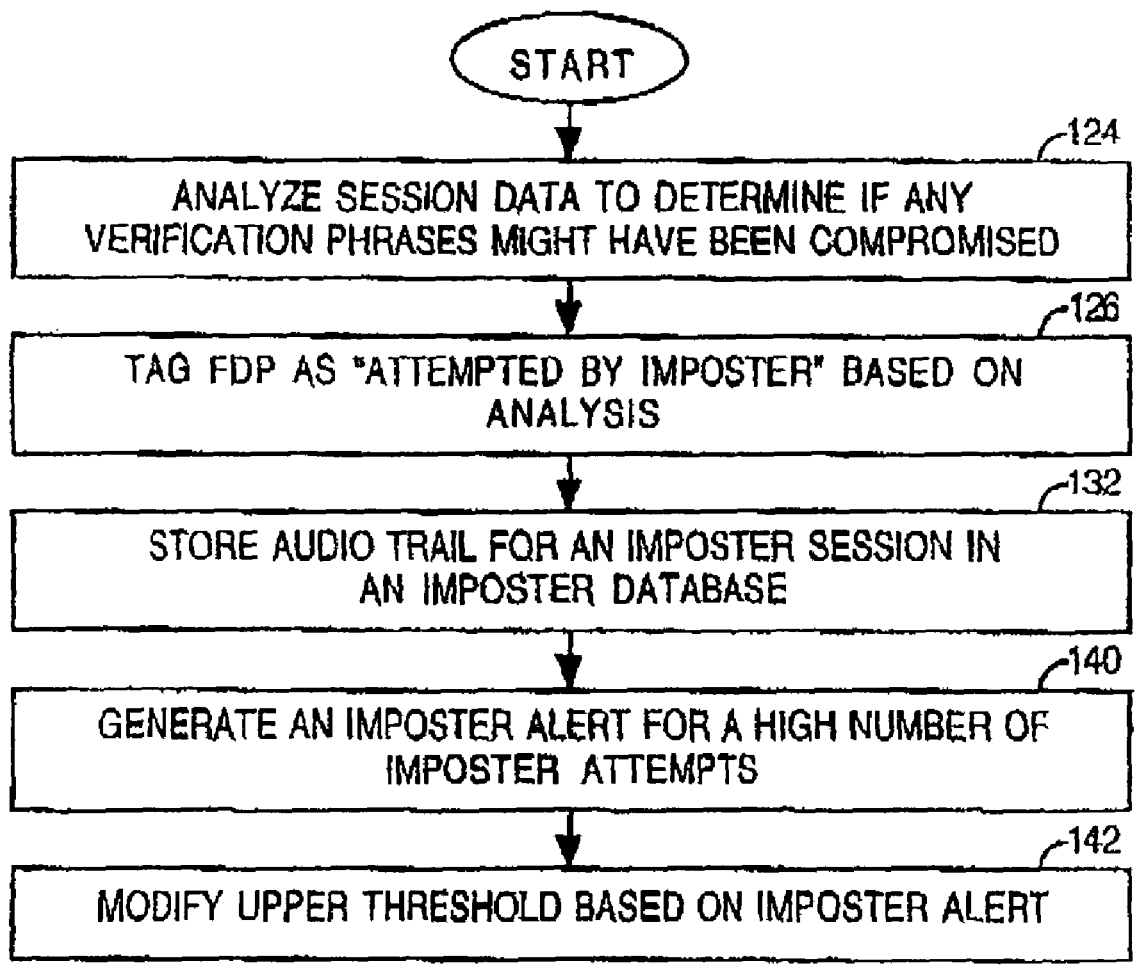
FIG. 4 is a flow chart of an embodiment of an imposter handling process.

FIG. 4 is a flow chart of an embodiment of an imposter handling process. For those sessions designated as an imposter session, the imposter handling process comprises analyzing the session data to determine if any verification phrases might have been compromised (block 124). For example, consider an imposter caller who failed the FDP check. The verification result from this session along with a number of successfully authenticated sessions (e.g. the last five) are analyzed. If the result of the analysis is that the voice characteristics of the caller belong to an imposter, the FDP will be tagged as one "attempted by an imposter" (block 126). At a future verification session, a different FDP will be selected for this user.

The audio trail, including the utterance files generated during an imposter session, is stored in an imposter database 130 (block 132). The utterances are sorted based on their texts to update various text-dependent anti-speaker models. The anti-speaker models contain voice characteristics of anyone else speaking a particular phrase like "Austin" or "Dallas Cowboy" versus a true speaker model built from that same phonetic context but from a single person. The anti-speaker models can be used to effectively answer two questions: (a) does the caller to be authenticated sound more like the claimed user; and (b) does the caller to be authenticated sound like anyone else. The imposter database 130 facilitates answering the second question.

The imposter database 130 is partitioned based on common text blocks used in individual phrases that have been marked as "attempted by imposters". In an absence of a large amount of imposter data, the imposter database 130 can be used as follows. Common text blocks shared by different dynamic phrases designated for different users can be searched. The common text blocks can be readily found using digits or city names. Based on the common text blocks, the utterances of words or phrases spoken by many, if not all, users are collected. An associated anti-speaker model is built for each registered user by extracting the common voice characteristics of the rest of the speaker population other than the targeted user.

As indicated by block 140, an imposter alert may be generated based on a set of predefined events associated with the imposter database 130. In response to the imposter alert, the upper threshold for high/medium/low confidence is increased either for a group of users or for all users, as indicated by block 142. This forces more verification sessions to go through the third verification step.

The methods and systems described herein can be applied to many different SIV applications. Examples of some particular applications include, but are not limited to, a corporate information security help desk, an IVR-based employee information system, and a client/server-based SIV system for company-wide access over a corporate-wide wide area network (WAN).

The document creation component, the registration component 23, the verification component 63, and the SIV engine can be embodied by one or more computer systems directed by computer program code stored on computer-readable media. The databases 14, 16, 18, 50 and 130 can be embodied by a variety of data structures stored to computer-readable media. Examples of the computer-readable media include, but are not limited to, optical media, magnetic media and electronic media.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

The invention claimed is:

1. A method comprising:
   generating and prompting a user to speak a first dynamic phrase (FDP), the FDP comprising at least one dynamically-generated word that is not a numeric word;
   receiving an FDP utterance;
   extracting at least one voice characteristic from the FDP utterance and comparing the at least one voice characteristic with a voice profile to generate a score: and
   determining whether to accept a speaker identity claim based on the score.

2. The method of claim 1, wherein determining whether to accept a speaker identity claim based on the score comprises:
   accepting the speaker identity claim when the score indicates a high confidence level.

3. The method of claim 1, wherein the FDP is selected from biographical, geographical and time-sensitive transactional information.

4. The method of claim 1, wherein determining whether to accept a speaker identify claim based on the score comprises:
   rejecting the speaker identity claim when the score indicates a low confidence level.

5. The method of claim 4, further comprising:
   tagging the FDP as being attempted by an imposter.

6. The method of claim 1, further comprising:
   modifying a threshold that the score must exceed to indicates a high confidence level.

7. The method of claim 6, wherein the threshold is modified based on an undesirably high level of imposter attempts.

8. The method of claim 1, wherein determining whether to accept a speaker identity claim based on the score comprises:
   determining the score indicates a medium confidence level;
   generating and prompting the user to speak a second dynamic phrase (SDP), the SDP comprising at least one dynamically-generated word;
   receiving a SDP utterance;
   extracting at least one voice characteristic from the SDP utterance and comparing the at least one voice characteristic with the voice profile to generate a second score; and
   determining whether to accept a speaker identity claim based on the second score.

9. The method of claim 8, wherein determining whether to accept a speaker identity claim based on the second score comprises:
   determining whether to accept a speaker identity claim based on the first and second scores.

10. The method of claim 8, further comprising:
    updating a voice profile associated with the speaker identity based on a confidence level indicated by the second score.

11. A computer-readable storage medium comprising a set of instructions to direct a processor to perform acts of:
    generating and prompting a user to speak a first dynamic phrase (FDP), the FDP comprising at least one dynamically-generated word that is not a numeric word;
    receiving an FDP utterance;
    extracting at least one voice characteristic from the FDP utterance and comparing the at least one voice characteristic to a voice profile to generate a score: and
    determining whether to accept a speaker identity claim based on the score.

12. The computer-readable storage medium of claim 11, wherein determining whether to accept a speaker identity claim based on the score comprises:
    accepting the speaker identity claim when the score indicates a high confidence level.

13. The computer-readable storage medium of claim 11, wherein determining whether to accept a speaker identity claim based on the score comprises:
    determining the score indicates a medium confidence level;
    generating and prompting the user to speak a second dynamic phrase (SDP), the SDP comprising at least one dynamically-generated word;
    receiving a SDP utterance;
    extracting at least one voice characteristic from the SDP utterance and comparing the at least one voice characteristic with the voice profile to generate a second score; and
    determining whether to accept a speaker identity claim based on the second score.

14. The computer-readable storage medium of claim 11, wherein determining whether to accept a speaker identify claim based on the score comprises:
    rejecting the speaker identity claim when the score indicates a low confidence level.

15. The computer-readable storage medium of claim 14, further comprising:
    tagging the FDP as being attempted by an imposter.

16. A system comprising:
    a voice profile database comprising a plurality of voice profiles; and
    a speaker identity verification engine in communication with the voice profile database, the speaker identity verification engine operative to generate a first dynamic phrase (FDP), the FDP comprising at least one dynamically generated word that is not a numeric word, to prompt a user to speak the FDP, to receive an FDP utterance, to extract at least one voice characteristic from the FDP utterance, to compare the at least one voice characteristic with at least one of the plurality of voice profiles, and to determine whether to accept a speaker identity claim based on the score.

17. The system of claim 16, wherein the speaker identity verification engine is further operative to reject the speaker identity claim when the score indicates a low confidence level.

18. The system of claim 16, wherein the speaker identity verification engine is further operative to accept the speaker identity claim when the score indicates a high confidence level.

19. The system of claim 16, wherein in response to determining the score indicates a medium confidence level, the speaker identity verification engine is further operative to generate a second dynamic phrase (SDP), the SDP comprising at least one dynamically-generated word, to prompt the user to speak the SDP, to receive a SDP utterance, to extract at least one voice characteristic from the SDP utterance, to compare the at least one voice characteristic with the voice profile to generate a second score, and to determine whether to accept the speaker identity claim based on the second score.

20. The system of claim 16, wherein the speaker identity verification engine is further operative to modify a threshold that the score must exceed to indicate a high confidence level based on a number of imposter attempts.

* * * * *